US009183299B2

(12) United States Patent
Friedman et al.

(10) Patent No.: US 9,183,299 B2
(45) Date of Patent: Nov. 10, 2015

(54) SEARCH ENGINE FOR RANKING A SET OF PAGES RETURNED AS SEARCH RESULTS FROM A SEARCH QUERY

(75) Inventors: Julian L. Friedman, Southampton (GB); Richard T. Leigh, Southampton (GB)

(73) Assignee: International Business Machines Corporation, Armonk, NY (US)

( * ) Notice: Subject to any disclaimer, the term of this patent is extended or adjusted under 35 U.S.C. 154(b) by 328 days.

(21) Appl. No.: 13/269,871

(22) Filed: Oct. 10, 2011

(65) Prior Publication Data

US 2012/0130974 A1 May 24, 2012

(30) Foreign Application Priority Data

Nov. 19, 2010 (EP) ..................................... 10101012

(51) Int. Cl.
*G06F 17/30* (2006.01)
(52) U.S. Cl.
CPC ................................ *G06F 17/30864* (2013.01)
(58) Field of Classification Search
CPC ................................................ G06F 17/30864
USPC .......................................... 707/706, 723, 726
See application file for complete search history.

(56) References Cited

U.S. PATENT DOCUMENTS

| | | | |
|---|---|---|---|
| 6,285,999 B1 | 9/2001 | Page | |
| 7,058,624 B2 * | 6/2006 | Masters | ......................... 707/723 |
| 7,599,917 B2 * | 10/2009 | Meyerzon et al. | ..................... 1/1 |
| 7,761,448 B2 * | 7/2010 | Meyerzon et al. | ............ 707/731 |
| 7,827,181 B2 * | 11/2010 | Petriuc | ........................... 707/742 |
| 2003/0115333 A1 * | 6/2003 | Cohen et al. | .................... 709/227 |
| 2005/0114322 A1 | 5/2005 | Melman | |
| 2006/0242138 A1 * | 10/2006 | Brill et al. | .......................... 707/5 |
| 2008/0313125 A1 * | 12/2008 | Galvin et al. | .................... 706/52 |
| 2010/0268707 A1 * | 10/2010 | Meyerzon et al. | ............ 707/724 |

OTHER PUBLICATIONS

Fagin et al, "Allowing users to weight search terms", 2000, Proceedings of RIAO '2000, pp. 682-700.*
Ryen W. White et al, "Assessing the Scenic Route: Measuring the Value of Search Trails in Web Logs", Jul. 19, 2010.*
Wikipedia, (online); (retrieved on Oct. 10, 2011) from the Internet http://en.wikipedia.org/wiki/HITS algorithm; pp. 1-5, "HITS algorithm" From: Wikipedia.
Saroj Kanchi and David Vineyard "An Optimal Distributed Algorithm for All-Pairs Shortest-Path"; International Journal Information Theories Applications (2004); vol. 11, Issue 2; pp. 141-146.

* cited by examiner

*Primary Examiner* — Brannon W Smith
(74) *Attorney, Agent, or Firm* — Cantor Colburn LLP; Joseph Polimeni (57) ABSTRACT

A method, apparatus and computer program for a search engine to rank a set of pages returned as search results from a search query. The search query and a first origin page are received. The search query includes one or more keywords and the first origin page is chosen based on information associated with the search query. A set of results is generated based on the one or more keywords. The click distance from the first origin page to each page in the returned set is then calculated. The click distance represents the number of intermediate pages that a user would need to traverse in order to progress from the first origin page to a page in the set of search results. The set of search results are then ranked based on the calculated click distance from the first origin page to a page in the set of results.

20 Claims, 6 Drawing Sheets

SEARCH ENGINE FOR RANKING A SET OF PAGES RETURNED AS SEARCH RESULTS FROM A SEARCH QUERY

CROSS-REFERENCE TO RELATED APPLICATIONS

This application claims priority to European Patent Application No. 10101012.4 filed 19 Nov. 2010, and all the benefits accruing therefrom under 35 U.S.C. §119, the contents of which in its entirety are herein incorporated by reference.

FIELD OF THE INVENTION

The invention relates to search engines and more particularly to how a search engine ranks its search results.

BACKGROUND OF THE INVENTION

Within an enterprise, search engines often have difficulty finding the most relevant pages for a given query. External search engines make use of algorithms such as the much publicised Google Page Rank algorithm. This is described in U.S. Pat. No. 6,285,999 (and subsequent patents, available on the Worldwide Web at en.wikipedia.org/wiki/Page Rank). Unfortunately this algorithm works poorly when used to search a company's Intranet because of the low number of incoming links. On the Internet, if a page is seen as useful, then typically lots of people will link to that page. However with a company's Intranet relevant and less-relevant pages alike are likely to have the same low number of inbound links each. This means that algorithms tuned for the Internet will make decisions based on information that has little significance in an Intranet environment. Further, pure keyword frequency may be an insufficient approach. Use of keyword frequency is described in US 2005/0114322 A1.

A large source of dissatisfaction with results is their irrelevancy to the user performing the query. U.S. Pat. No. 7,599,917 discloses a solution which determines a document relevance score for documents on a network. The document relevance score is calculated using a ranking function that contains one or more query-dependent components as well as one or more query-independent components. The query-independent functionality allows an administrator or the system to identify authoritative (important) documents in the network. The query-dependent data or content-related portion of the ranking document depends on the actual search terms and the content of the given document.

Hyperlink-Induced Topic Search (HITS) is an algorithm also known for ranking web pages (en.wikipedia.org/wiki/HITS algorithm). HITS is used to identify hubs (those pages that have a certain number of outgoing links) and authorities (those pages to which others refer).

The prior art solutions disclosed do not address the problem identified by the following example:

A user searches for "University Relations" from the search bar on UK based company X's Homepage. Based on keyword counts, the US and Brazil University Relations pages currently rank more highly than the UK pages. In the solution described above, an administrator or the system itself may have identified important pages within the network and this may also make a difference to the ranking of pages. What is needed however is for the UK University Relations Program to be ranked more highly than the US and Brazil programs, because the search was carried out by a user based in London. Current attempts at providing a solution involve geographic knowledge about users' IP addresses, and language information in the pages and page metadata. However, in this example, the page resides on a server in Germany, and so may even be marked down despite being the best page for the user.

BRIEF SUMMARY

According to a first aspect, there is provided a method for a search engine to rank a set of pages returned as search results from a search query, the method includes: receiving a search query and a first origin page, the search query including one or more keywords, where the first origin page is chosen based on information associated with the search query; generating a set of search results based on the one or more keywords; calculating a click distance from the first origin page to each page returned in the set, where the click distance represents the number of intermediate pages that a user would need to traverse in order to progress from the first origin page to a page in the set of search results; and ranking the set of search results based on the calculated click distance from the first origin page to a page in the set of results.

According to a second aspect, there is provided an apparatus for a search engine to rank a set of pages returned as search results from a search query, the apparatus including: means for receiving a search query and a first origin page, the search query including one or more keywords, where the first origin page is chosen based on information associated with the search query; means for generating a set of search results based on the one or more keywords; means for calculating a click distance from the first origin page to each page returned in the set, where the click distance represents the number of intermediate pages that a user would need to traverse in order to progress from the first origin page to a page in the set of search results; and means for ranking the set of search results based on the calculated click distance from the first origin page to a page in the set of results.

According to a further aspect, there is provided a computer program including program means adapted to perform a method for a search engine to rank a set of pages returned as search results from a search query when the program is run on a computer, the method includes: receiving a search query and a first origin page, the search query including one or more keywords, where the first origin page is chosen based on information associated with the search query; generating a set of search results based on the one or more keywords; calculating a click distance from the first origin page to each page returned in the set, where the click distance represents the number of intermediate pages that a user would need to traverse in order to progress from the first origin page to a page in the set of search results; and ranking the set of search results based on the calculated click distance from the first origin page to a page in the set of results.

BRIEF DESCRIPTION OF THE SEVERAL VIEWS OF THE DRAWINGS

A preferred embodiment of the present invention will now be described, by way of example only, and with reference to the following drawings.

DETAILED DESCRIPTION

Figure 1:
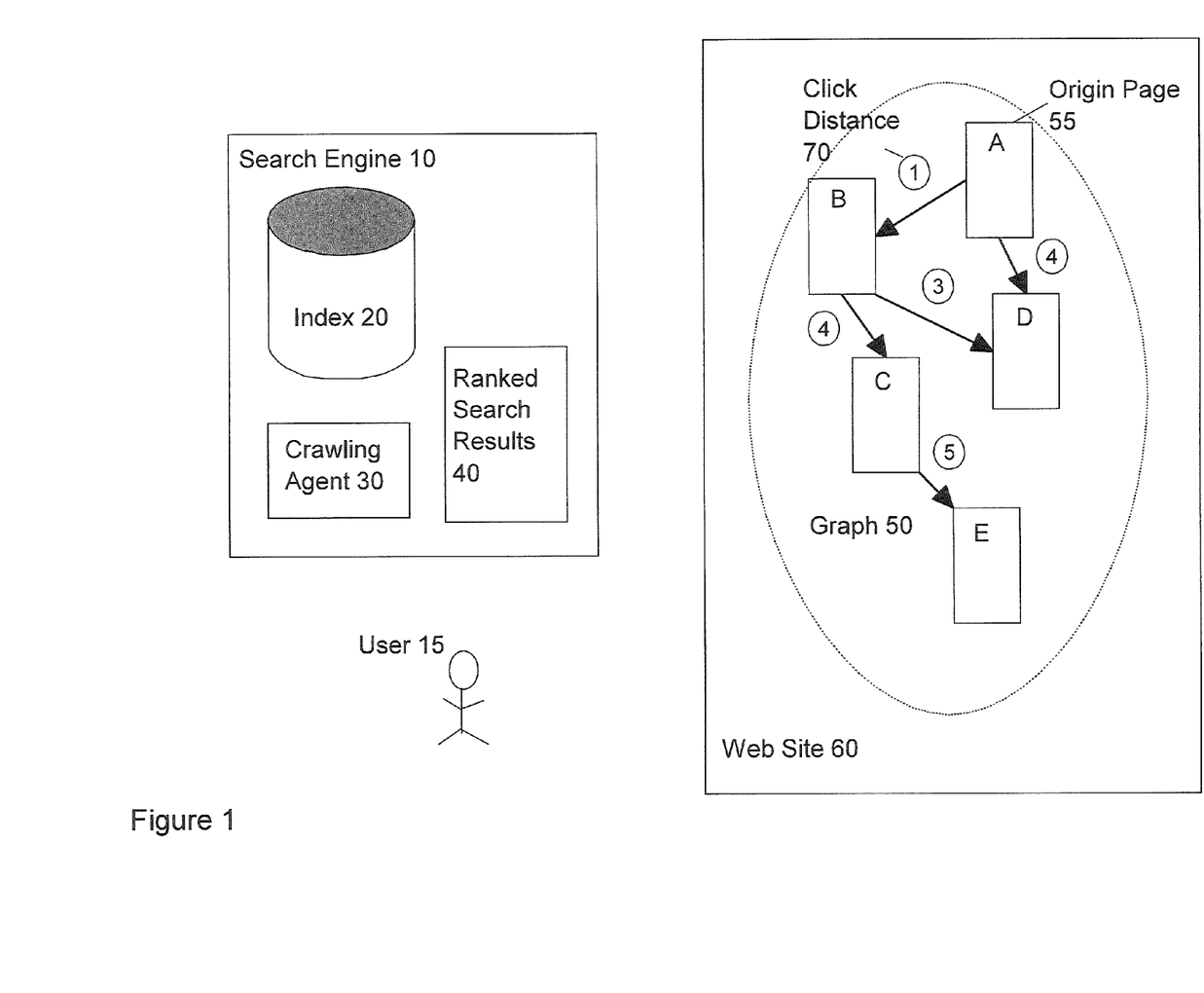
FIG. 1 shows the componentry of the present invention, in accordance with a preferred embodiment.

FIG. 1 shows the componentry of the present invention, in accordance with a preferred embodiment. It should be read in conjunction with FIGS. 2 to 4, which illustrate the processing of the present invention, in accordance with a preferred embodiment.

Each company will typically provide access to the services of a search engine 10 which will enable an employee (user 15) to locate web pages A, B, C, D, E within a company's Intranet. Such a search engine typically creates an index 20 of the web pages that it is responsible for (website 60). The index enables the search engine to respond to queries from user 15 and to return a set of search results 40. A search results page provides the user with a list of links to pages containing keywords requested by the user.

Figure 2:
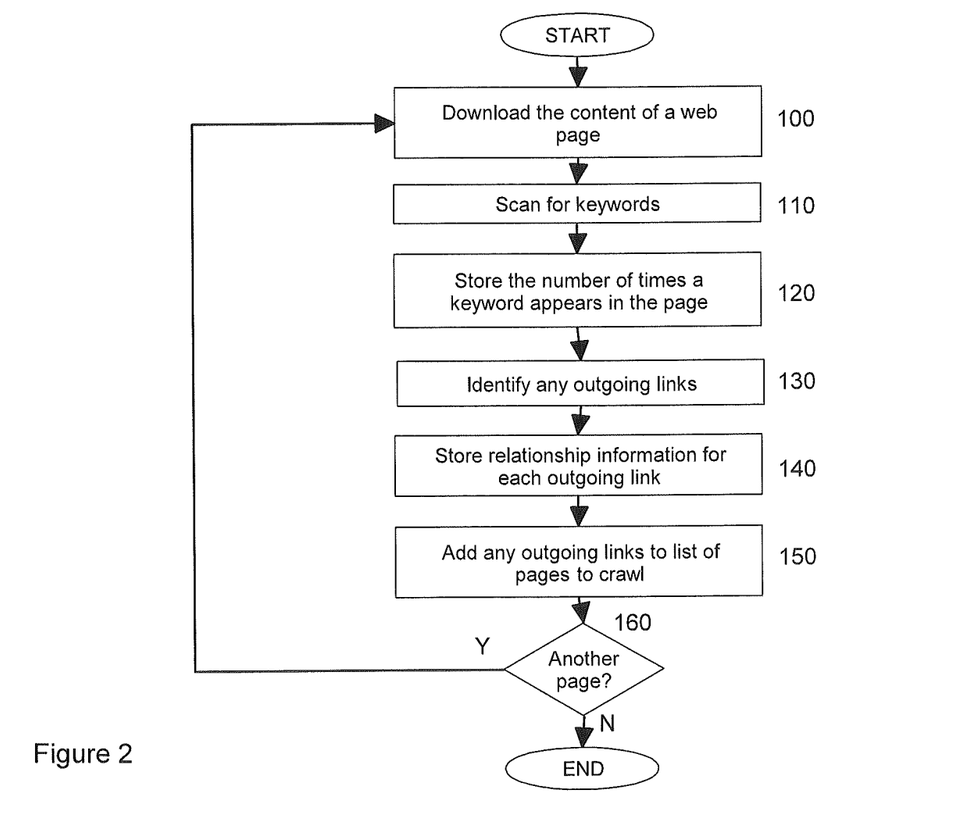
FIGS. 2 to 4 illustrate the processing of the present invention, in accordance with a preferred embodiment.

FIG. 2 illustrates exemplary processing with respect to the creation of the search index 20. It is known for a search engine 10 to use a crawling agent 30 (sometimes called a "spider") to explore web pages. The search engine's administrator will typically provide the crawling agent with a set of seed pages to explore (crawl). At step 100 the contents of one of these seed pages is downloaded by agent 30 and is scanned for keywords at step 110. The number of times each keyword appears in the web page is then stored in index 20 (step 120). The crawling agent 30 also identifies any outgoing hyperlinks accessible from within the page (step 130). Relationship information indicating that the current web page is related to pages linked to via that current web page is also stored in the index database 20 (step 140). All outgoing links are added to the current list of pages to crawl (e.g. the seed pages) at step 150. It is determined at step 160 whether there are any more pages to crawl and if not, the process ends. Otherwise the process loops round to step 100 and processing continues until all pages have been crawled. It will of course be appreciated that a web site is typically dynamic and that pages are being added, deleted and changed continually. Thus the crawling agent will preferably periodically update its index information.

At the end of the index creation process, the index database 20 stores at least information on the location of each web page and the number of times a keyword appears in each web page. The index database will also store information on the relationship between all the pages it has crawled. This information may be stored separately with the database, or indeed elsewhere. It will be appreciated that an index may contain additional information and that this is down to the individual search service provider.

Figure 3:
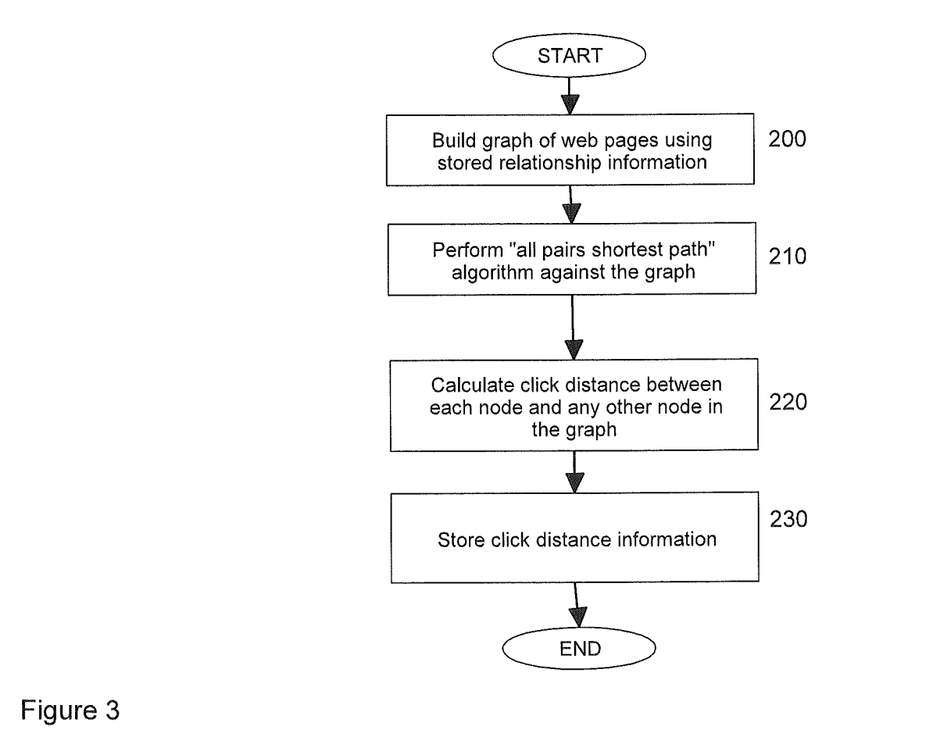

Having created a search index and stored relationship information about the web pages crawled, a graph 50 showing the relationship between the web pages is constructed (step 200). Whilst this graph is shown residing as part of the web site 60, in reality this is likely to be constructed in a memory local to the search engine 10.

An "all pairs shortest path" algorithm (e.g. as described on the Worldwide Web at www.foibg.com/ijita/vol11/ijita11-2-p06.pdf) is then executed against the graph at step 210 to identify the shortest distance (route) between any two nodes (web pages) in the graph.

The information determined at step 210 is then used to calculate the click distance 70 between each node and any other node in the graph (step 220). The click distance represents the number of intermediate pages that a user would have to traverse in order to progress from a source node to a target node. This information is then stored in the index database 20 at step 230. For ease of explanation, this information is shown in FIG. 1 overlaid on graph 50. It will be appreciated that such information may be stored in a tabular format within database index 20. E.g. B to D has a click distance of 3. The graph shown in FIG. 1 also shows only a subset of the information with respect to click distance. The information actually stored within index 20 is preferably complete such that there will be a click distance stored for every node pair between which it is possible to traverse. It should be appreciated that the lettering (A, B, C, D, E) is not intended to necessarily imply that a specific sequence must be followed when traversing between web pages in this example. For example, page D is not reached via page C.

The click distance information stored may be altered in accordance with a weighted value. For example, page A to D may have a click distance of 4 (A to B is 1 and then B to D is 3), however the final page before the fourth page (i.e. page D) may be a redirect page indicating that the third page may comprise a page redirecting the user to page D. Thus in one embodiment, the third page shouldn't count and therefore a weighting may be applied to lower the click distance to a value of 3. The mechanism by which a page is identified as a 'redirect' page is outside the scope of this discussion. Examples include: HTTP 301/302 status, HTTP meta redirect tag, Javascript™ navigator location changes, phrases like "please update bookmarks to point to" etc. When such a page is found, giving a click distance of 0 to the link to that page in order to the correct page removes the penalty of having a longer path. (Java and all Java-based trademarks and logos are trademarks of Sun Microsystems, Inc. in the United States, other countries, or both.)

Whilst some pages may be discounted in determining click distance (as described above), it is possible to weight certain pages poorly by giving them a large click distance. A webmaster could flag bodies of information such as an old website acquired when a new company is bought. Following such links would have a click distance greater than, say, 10. This could be done with metadata on the pages themselves rather than through the links, though either is acceptable. For example, the rel="nofollow" attribute may cause a certain click distance to be applied. It may also help to weight links found in standard templates in this way. For example, certain pages on a company webpage will often contain a number of standard links (template links). These might be links to the Corporate home page and the Corporate Directory Service. Such links will have a click distance of 1 from almost any page on the network, and/or a huge incoming link count. This will skew the results. This problem can be addressed by identifying such template links and weighting them such that they are discounted when ordering search results.

As alluded to above, the click distance value associated with a web page may not be the actual click distance. It may be a weighted value. Additionally the actual click distance may have been converted such that it is relevant to a particular scale (e.g. a scale running from 0 to 2.0).

The search engine administrator preferably configures what weightings should be applied and when.

Figure 4:
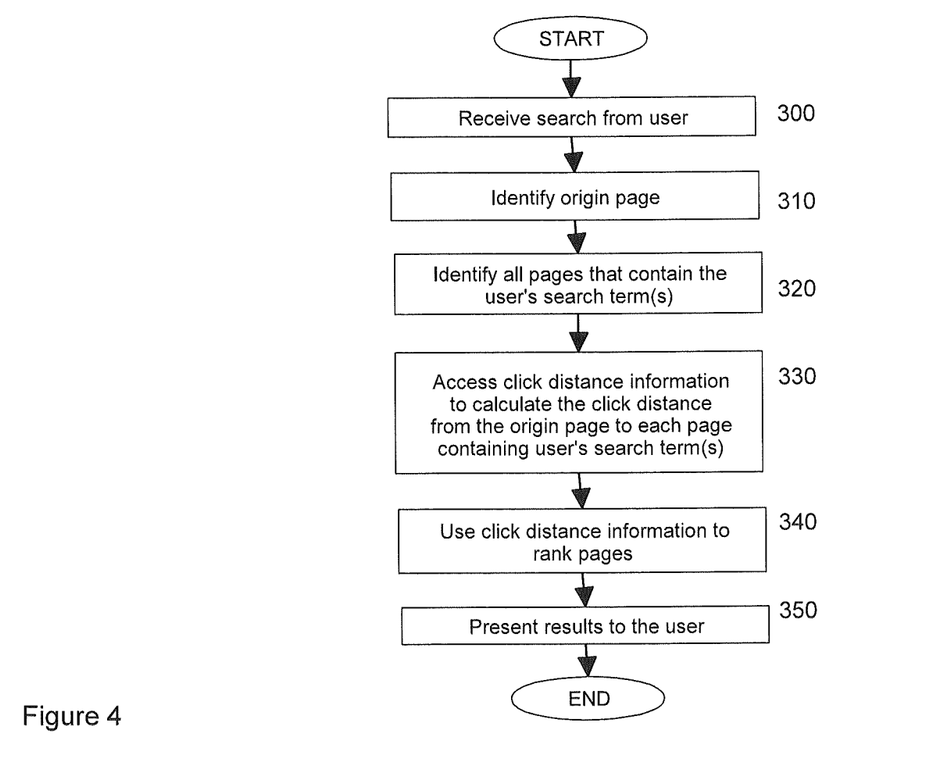

FIGS. 2 and 3 thus illustrate the setup process in order to enable a user to search a set of web pages using search engine 10. FIG. 4 illustrates the search process in accordance with a preferred embodiment.

With reference now to FIG. 4, at step 300, a search query is received by search engine 10. This involves the user entering some keyword terms into a search bar from within one of the company's web pages.

An origin page 55 is identified at step 310. The way in which such an origin page may be identified will be described in more detail subsequently. It is sufficient to say for now that an origin page denotes a likely start point that a user might start from if they were looking for a resource without the aid of the search engine. Thus if the user works for company X and is based in London, then this might be company X's London Home Page.

A search is carried out as it normally would be and this involves identifying (using index 20) all pages that contain the user's search term(s) (step 320). At step 330, the click distance information 70 is then accessed and used to calculate the click distance from the identified origin pate to each page containing the user's search terms(s). The click distance information is then used at step 340 to rank the search results before presentation to the user at step 350.

Pages which are a small click distance away from the origin page are preferably ranked more highly than pages which are a greater click distance away from the origin page.

There are a variety of ways in which the origin page may be selected. A selection of these will now be discussed below:

The searching user may identify the origin page to the search engine 10.

The administrator of the web site 60 may statically code such information into the HTML for its web pages. An HTML code snippet may be added by the administrator to pages under their control. This snippet will identify the search engine to use and how to pass a parameter to the search engine. In this example, this may be a "keywords" parameter which will contain the search terms that the user wishes to use. The administrator can also pass an indication to search engine as to which page should be used as an origin when the search originates from a particular page. It may also be possible to have multiple possible origins and to give the searching user the chance to select from a list. Alternatively creation of a search option could be a privileged operation and administrators could coordinate with search engine owners to get a unique ID and pass that to the URL. This provides a layer of control over who can specify an origin. Yet a further option would be for users to logon to a particular website. This website may contain a database indicating information about the user and this information could be used in selecting an appropriate origin page.

A sensible default could be the page the user submitted the search request from.

HTML has the concept of a "Referrer Page". This is the page from which a user has originated. Thus if a user performs a search from page A, then page A is the referrer page and this information can be passed to search engine 10. The referrer page may be used by the search engine as the origin page, or as a means to determine the origin page. For example, if the referrer page was www.example.com/some/where/page-.html, part of the URL may be truncated and the remainder used as the origin page.

The IP address of the searching user can be used to identify the location of that user. The search engine may then select a web page that is appropriate co-located with the user and which can be identified as a good authority of information. For example, if the user is London based, then company X's London home page may be selected since it is co-located with the user and has a large number of outgoing links. Even if the home page is not actually hosted by a London server (and thus the IP address may indicate a different location to that of the user), meta data may identify it as the London home page.

Certain web pages store information about a user in the form of a "cookie". Other databases such as user profiles and a company employee directory may also store information about the user. Such information may be used in selecting an origin page for the user. For example, the system may be able to deduce from the company directory that a user works in a particular area and therefore might be interested in a set of web pages maintained by that area.

It should be appreciated that the use of click distance from an origin page is merely one factor of many that may be used in ranking search results. For example, a page could be ranked more highly when it contains a particular keyword in the title, rather than just its body. Pages with all keywords in the title and a short click distance away from an origin page should come first, pages with a large click distance and only using the keywords in the body should come nearer the bottom. The handling of intermediate cases (e.g. some keywords in the title and a short click distance versus just keywords in the body of a page etc.) is down to an individual search engine implementation.

It would also be possible to also take into account geography in any hybrid system. Thus a score could be obtained taking into account click distance from origin, a separate score could be obtained which dealt with the geography in which the page is hosted and how close that is to the user's geography and another score could be calculated with respect to keyword hits. The pages that did best overall could be ranked most highly.

It is important to appreciate that click distance from an origin page may be used as the main criterion for ranking of search results, but it is still preferably just one of many.

Thus far a single origin page has been used to rank search results. An extension to this is the use of multiple search origins. For example, the first origin page may be based on the fact that the user is based in London (i.e. the origin page may be the London home page). The second origin page may be based on additional information deduced about the user from a user profile such as that they work in a particular area of the company. Thus a search is performed to identify relevant pages and then the distance from all specified origins to those pages is retrieved. This is then used to rank identified pages.

It is possible to use just the shortest distance, but this may unjustly increase the score of pages from sections of the search space where the average distance from one origin for relevant documents is shorter than that from another origin. This may be due to the design of different areas of the search space. For example, the first origin page might be the landing page for a small twelve page microsite, whilst another origin is the start page for an information centre containing a large number of web pages. The nodes in the information centre may on average be a lot further from their most favourable origin than those for the microsite, and so will have a worse ranking.

To avoid this inaccuracy, the ranking scores are preferably modified. This is explained with reference to FIGS. 5 and 6.

Figure 5:
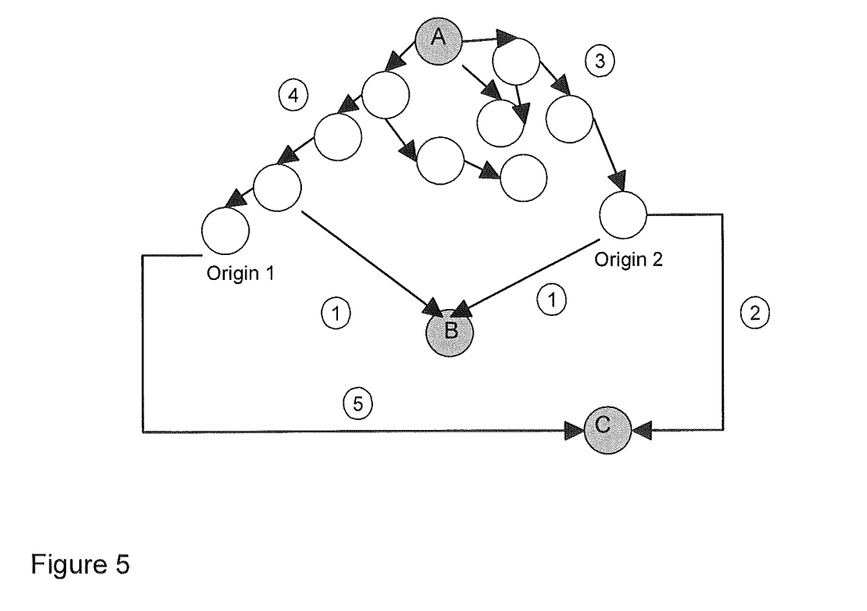
FIG. 5 illustrates an exemplary graph of web pages.
Figure 6:
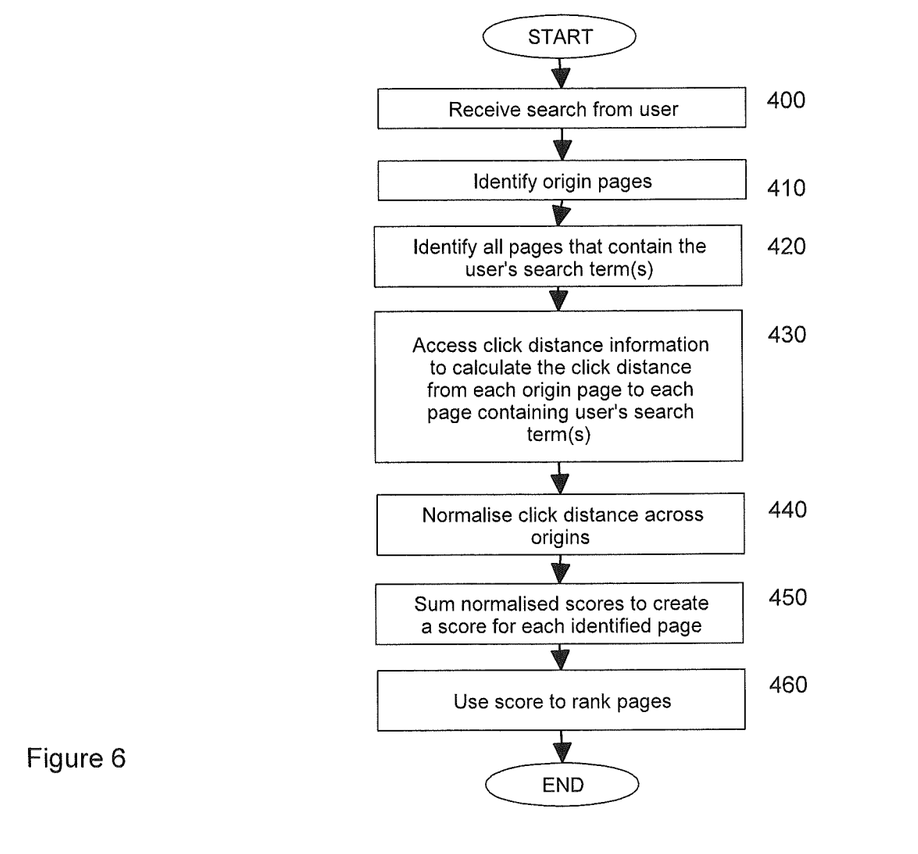
FIG. 6 illustrates, in accordance with a preferred embodiment, the processing involved when there are multiple origin pages.

FIG. 5 illustrates an exemplary graph of web pages. Arrows indicate the direction of links between such pages. FIG. 6 illustrates, in accordance with a preferred embodiment, the processing involved when there are multiple origin pages.

A search is received from a user at step 400 and two origin pages (origin page 1 and origin page 2) are identified at step 410. All pages containing the user's search term(s) are identified at step 420. In this case just three pages A, B and C are identified. Click distance information is then accessed to calculate the click distance from each origin page to pages A, B and C (step 430). As shown in FIG. 5, this information is as follows:

i) Origin 1->A=4
ii) Origin 1->B=1
iii) Origin 1->C=5
iv) Origin 2->A=3
v) Origin 2->B=1
vi) Origin 2->C=2

This information is then normalised at step 440. The normalisation process is optional but is used to address the issue that various areas of the search space may be designed differently than others, with some being more densely populated.

The process could be as follows:

The longest click distance for Origin 1 is 5 (see iii)), so click distances for origin 1 should be divided by 5.

The longest distance for Origin 2 is 3 (see iv)), so click distances for Origin 2 should be divided by 3.

This results in the following:
Origin 1->A=4/5
Origin 1->B=1/5
Origin 1->C=5/5=1
Origin 2->A=1=3/3=1
Origin 2->B=1/3
Origin 3->C=2/3

This score is then mapped over the 1.0 to 0.0 range. A high score is typically a good thing but in this instance a high score indicates a greater click distance which would ultimately rate a page poorly. Thus the mapping is reversed such that the shortest click distance results in a high score and the longest click distance is given a low score. This results in the following:
Origin 1->A=1/5
Origin 1->B=4/5
Origin 1->C=0
Origin 2->A=0
Origin 2->B=2/3
Origin 2->C=1/3

This mapping can be a simple linear projection over the range, or it could be e.g. exponential, so that only the closer documents contribute much, and many of the further away documents begin to be considered noise. Field tuning of this mapping is recommended.

In one embodiment, a threshold against the distance is used. For example, any page with a shortest path more than 6 steps away from the origin is considered too far from this origin, and receives the poorest possible score from it. (Obviously this value is tuneable, and could be specified per origin instead of globally).

At step 450, the normalised scores are summed. This results in:
A=0.2
B=1.47
C=0.34

Pages A, B and C are then presented taking into account the summed scores (step 460). As indicated above, the higher the score, the shorter the click distance. Thus B will be ranked more highly than either C or A because B is closer to more origin pages.

Again this can be a simple sum, or somehow weighted (e.g. double the best score, and throw away the lowest 75% of normalized scores). This factor then goes into the overall mix with other factors such as page rank, date and so on to give a final ordering.

It will be appreciated that parts of the graph may be disconnected such that there could be no link between an origin page and a page containing relevant keyword(s). One way to handle this would be to set the score for that page to 0.

An overall implementation could be expressed mathematically in the following manner:

To determine a numeric score S(r) for a particular result r from the set of results R found in the keyword matching step 420, we consider the following. Let $D_i$ be the set of all click distances for search origin $O_i$, and $D_i(r)$ be the click distance from $O_i$ to r (step 430). As the average value of $D_i$ and $D_j$ will vary greatly between $O_i$ and $O_j$, it is necessary to normalise the values (step 440) before making meaningful comparisons between $D_i(r)$ and $D_j(r)$.

The normalised click distances $\hat{D}$ (a preferred embodiment uses $$\widehat{D_i(r)} = \frac{D_i(r)}{\max(D_i)}$$

are then mapped to $D'=f(\hat{D})$, where $f(0)=1$, $f(1)=0$ and $f: \{x \bar{\omega}', 0 \le x \le 1\} \blacklozenge \{y \bar{\omega}', 0 \le x \le 1\}$. The goal of f is to yield low scores for pages with a long click distance, and high scores for pages with short click distances. A simple implementation could be $f(x)=1-x$, whereas $f(x)=1-\sqrt{x}$ emphasises shorter click distances at the expense of moderate ones. Where there is no path from $O_i$ to r, we define $D'_i(r)=0$. We then use the values $D'(r)$ to find $S(r)$ (step 450). This could be achieved by a simple sum $S(r)=\sum_{i=0}^{n} D'_i(r)$, by use of weighting $S(r)=\sum_{i=0}^{n} \omega_i D'_i(r)$ (which makes the influence of $O_i$ more or less pronounced), or any other means. These numeric scores could be further combined with those from other ranking methods, but are ultimately sorted to give the ranked list to the user (step 460).

According to an embodiment described herein, there is provided a method for a search engine to rank a set of pages returned as search results from a search query, the method includes: receiving a search query and a first origin page, the search query including one or more keywords, wherein the first origin page is chosen based on information associated with the search query; generating set of search results based on the one or more keywords; calculating a click distance from the first origin page to each page returned in the set, wherein the click distance represents the number of intermediate pages that a user would need to traverse in order to progress from the first origin page to a page in the set of search results; and ranking the set of search results based on the calculated click distance from the first origin page to each page in the set of results.

A determination is preferably made as to when to apply a weighting to a click distance representing the distance between the first origin page and a particular page in the set of search results.

A plurality of origin pages may be received with the search query. Each origin page is preferably chosen based on information associated with the search query.

The click distance is preferably calculated from each origin page in the plurality of origin pages to each page in the set of search results.

The click distances are preferably normalised.

The calculated click distances are preferably used to rank the pages in the search results with respect to the plurality of origin pages.

A determination is preferably made as to when to apply a weighting to a click distance representing the distance between a second origin page and a particular page in the set of search results.

In an embodiment, at least one origin page is identified, the search query is composed including one or more keywords specified by the user, and the search query and the at least one identified origin page is sent to the search engine.

The step of identifying an origin page may, by way of example, include one of the following: receiving the origin page from the user, identifying the origin page based on the page from which the search query is submitted, identifying the origin page based on the geographic location of the user, and identifying the origin page based information stored about the user.

The invention claimed is:

1. A method for a search engine to rank a set of pages returned as search results from a search query, the method comprising:
   receiving a search query, a first origin page, and a second origin page, the search query including one or more keywords, wherein the first origin page and the second origin page are chosen based on information associated with the search query;
   generating set of search results based on the one or more keywords;
   creating an index database by storing at least information on the location of a plurality of web pages where at least one keyword was found and the number of times the keyword relating to the search query appears in each web page;
   establishing information on any relationship between the web pages;
   calculating a first click distance from the first origin page to each page returned in the set, wherein the first click distance represents the number of intermediate pages that a user would need to traverse in order to progress from the first origin page to a page in the set of search results, wherein the first click distances are normalized, wherein normalizing the calculated first click distance is performed by scaling the first click distance by a maximum click distance from the first origin page to a farthest result from the first origin page;
   calculating a second click distance from the second origin page to each page returned in the set, wherein the second click distance represents the number of intermediate pages that a user would need to traverse in order to progress from the second origin page to a page in the set of search results, wherein the second click distances are normalized, wherein normalizing the calculated second click distance is performed by scaling the second click distance by a maximum click distance from the second origin page to a farthest result from the second origin page;
   summing the normalized first and second click distance for each page in the set of results;
   ranking the set of search results based on the summed click distances;
   determining existence of any additional factors, wherein the additional factors include user preferences or other information that affect speed and accessibility of the web pages for completing the search query; and
   re-ranking the search results by applying a weighted value when additional factors were determined, wherein the weight of the value is determined by type of the additional factor determined.

2. The method of claim 1, wherein the determining of when to apply a weighting to a click distance is performed based on the distance between the first origin page and a particular page in the set of search results.

3. The method of claim 2, further comprising:
   receiving a plurality of origin pages with the search query, wherein each origin page is chosen based on information associated with the search query;
   calculating normalized click distances for each page in the set of search results for each of the plurality of origin pages; and
   summing the calculated normalized click distances for each page in the set of search results.

4. The method of claim 3, further comprising:
   calculating the click distance from each origin page in the plurality of origin pages to each page in the set of search results; and
   setting a threshold that when exceeded the click distance is considered too distant to be calculated in the search.

5. The method of claim 4, wherein normalizing the calculated click distances further comprises performing performed by $$\widetilde{Di(r)} = \frac{Di(r)}{\max(Di)}$$

where $D_i$ is a set of all click distances for the origin page $O_i$ and $D(r)$ is the click distance from $O_i$ to the result r.

6. The method of claim 4, further comprising:
   searching the index when receiving a new query to determine if relationship between pages have been established;
   using the calculated click distances from the index; and
   ranking the pages in the search results with respect to the plurality of origin pages.

7. The method of claim 4, further comprising:
   determining when to apply a weighting to a click distance representing the distance between a the second origin page and a particular page in the set of search results.

8. The method of claim 1, further comprising:
   identifying at least one origin page;
   composing the search query including the one or more keywords specified by the user; and
   sending the search query and the at least one identified origin page to the search engine.

9. The method of claim 8, wherein the step of identifying the first origin page comprises one of:
   receiving the first origin page from the user;
   identifying the first origin page based on the page from which the search query is submitted;
   identifying the first origin page based on the geographic location of the user; and
   identifying the first origin page based information stored about the user.

10. An apparatus to rank a set of pages returned as search results from a search query, the apparatus comprising:
    a computer comprising a non-transitory computer readable medium, the medium storing search engine configured to receive a search query, a first origin page, and second origin page, the search query including one or more keywords, wherein the first origin page and the second origin page are chosen based on information associated with the search query;
    the search engine comprising instructions executing a method, the method comprising:
    generating set of search results based on the one or more keywords;
    calculating a click distance from the first origin page to each page returned in the set, wherein the click distance represents the number of intermediate pages that a user would need to traverse in order to progress from the first origin page to a page in the set of search results; and
    calculating the set of search results, the calculating comprising:
    calculating a first click distance from the first origin page to each page returned in the set, wherein the first click distance represents the number of intermediate pages that a user would need to traverse in order to progress from the first origin page to a page in the set of search results, wherein the first click distances are normalized, wherein normalizing the calculated first click distance is performed by scaling the first click distance by a maximum click distance from the first origin page to a farthest result from the first origin page;

calculating a second click distance from the second origin page to each page returned in the set, wherein the second click distance represents the number of intermediate pages that a user would need to traverse in order to progress from the second origin page to a page in the set of search results, wherein the second click distances are normalized, wherein normalizing the calculated second click distance is performed by scaling the second click distance by a maximum click distance from the second origin page to a farthest result from the second origin page;

summing the normalized first and second click distance for each page in the set of results;

ranking the set of search results based on the summed click distances;

determining existence of any additional factors, wherein the additional factors include user preferences or other information that affect speed and accessibility of the web pages for completing the search query; and re-ranking the search results by applying a weighted value when additional factors were determined, wherein the weight of the value is determined by type of the additional factor determined.

11. The apparatus of claim 10, the executed method further comprising: determines when to apply the weighting to a click distance by analyzing the distance between the first origin page and a particular page in the set of search results.

12. The apparatus of claim 10, the executed method further comprising:

receiving a plurality of origin pages with the search query, wherein each origin page is chosen based on information associated with the search query calculating normalized click distances for each page in the set of search results for each of the plurality of origin pages; and summing the calculated normalized click distances for each page in the set of search results.

13. The apparatus of claim 12, the executed method further comprising:

calculating the click distance from each origin page in the plurality of origin pages to each page in the set of search results.

14. The apparatus of claim 13, the executed method further comprising: setting a threshold that when exceeded the click distance is considered too distant to be calculated in the search.

15. The apparatus of claim 13, the executed method further comprising:

using the calculated click distances to rank the pages in the search results with respect to the plurality of origin pages.

16. The apparatus of claim 13, the executed method further comprising:

determining when to apply a weighting to a click distance representing the distance between a second origin page and a particular page in the set of search results.

17. The apparatus of claim 10, the executed method further comprising:

identifying at least one origin page;

composing the search query including the one or more keywords specified by the user; and sending the search query and the at least one identified origin page to the search engine.

18. The apparatus of claim 17, wherein identifying the first origin page comprises one of:

receiving the first origin page from the user;

identifying the first origin page based on the page from which the search query is submitted;

identifying the first origin page based on the geographic location of the user; and identifying the first origin page based information stored about the user.

19. A computer program product for ranking a set of pages returned as search results from a search query, the computer program product comprising:

a non-transitory medium readable by a processing circuit and storing instructions for execution by the processing circuit for performing a method comprising;

receiving a search query, a first origin page, and a second origin page, the search query including one or more keywords, wherein the first origin page and the second origin page are chosen based on information associated with the search query;

the computer search engine generating set of search results based on the one or more keywords;

calculating a first click distance from the first origin page to each page returned in the set, wherein the first click distance represents the number of intermediate pages that a user would need to traverse in order to progress from the first origin page to a page in the set of search results, wherein the first click distances are normalized, wherein normalizing the calculated first click distance is performed by scaling the first click distance by a maximum click distance from the first origin page to a farthest result from the first origin page;

calculating a second click distance from the second origin page to each page returned in the set, wherein the second click distance represents the number of intermediate pages that a user would need to traverse in order to progress from the second origin page to a page in the set of search results, wherein the second click distances are normalized, wherein normalizing the calculated second click distance is performed by scaling the second click distance by a maximum click distance from the second origin page to a farthest result from the second origin page;

summing the normalized first and second click distance for each page in the set of results;

ranking the set of search results based on the summed click distances;

determining existence of any additional factors, wherein the additional factors include user preferences or other information that affect speed and accessibility of the web pages for completing the search query; and re-ranking the search results by applying a weighted value when additional factors were determined, wherein the weight of the value is determined by type of the additional factor determined.

20. The computer program product of claim 19, wherein the method further comprises:

determining when to apply a weighting to a click distance representing the distance between the first origin page and a particular page in the set of search results.

* * * * *